US010849460B2

(12) United States Patent
Hedrington et al.

(10) Patent No.: US 10,849,460 B2
(45) Date of Patent: Dec. 1, 2020

(54) ROTISSERIE TURKEY DEEP FRYER

(71) Applicant: National Presto Industries, Inc., Eau Claire, WI (US)

(72) Inventors: James A. Hedrington, Chippewa Falls, WI (US); Michael R. Berge, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 68 days.

(21) Appl. No.: 15/923,578

(22) Filed: Mar. 16, 2018

(65) Prior Publication Data

US 2018/0263418 A1   Sep. 20, 2018

Related U.S. Application Data

(60) Provisional application No. 62/473,001, filed on Mar. 17, 2017.

(51) Int. Cl.
| | |
|---|---|
| *A47J 37/12* | (2006.01) |
| *A23L 5/10* | (2016.01) |
| *A23L 13/50* | (2016.01) |
| *A47J 37/04* | (2006.01) |

(52) U.S. Cl.
CPC ........... *A47J 37/1219* (2013.01); *A23L 5/11* (2016.08); *A23L 13/50* (2016.08); *A47J 37/041* (2013.01); *A47J 37/1266* (2013.01); *A23V 2002/00* (2013.01)

(58) Field of Classification Search
CPC .. A47J 37/1219; A47J 37/041; A47J 37/1266; A47J 37/1295; A47J 37/1204; A47J 37/1209; A47J 37/1223

USPC ......... 99/337, 339, 340, 403, 407, 409, 417, 99/447

See application file for complete search history.

(56) References Cited

U.S. PATENT DOCUMENTS

| | | | |
|---|---|---|---|
| D272,034 S | 1/1984 | Beugnot | |
| 4,877,011 A * | 10/1989 | Willice | A47J 37/0704 |
| | | | 126/25 R |
| D347,353 S | 5/1994 | Piret | |
| D473,097 S | 4/2003 | Brown | |
| D539,599 S | 2/2007 | De'Longhi | |
| D609,962 S | 2/2010 | Florotto | |
| D610,392 S | 2/2010 | Florotto | |
| D610,866 S | 3/2010 | Florotto | |
| D672,600 S | 12/2012 | Berge | |
| 8,474,371 B2 * | 7/2013 | Rutigliano | A47J 37/1219 |
| | | | 99/403 |
| 8,707,857 B2 | 4/2014 | Popiel et al. | |

(Continued)

*Primary Examiner* — Phuong T Nguyen

(57) ABSTRACT

A deep fryer and methods of frying a whole turkey in a reduced cooking oil volume. A frying basin can have a rounded profile avoiding dead spaces within the frying basin. The frying basin can include a recessed channel at a bottommost portion of the frying basin to accommodate a heating element, such that the heating element does not project above a floor of the frying basin. The deep fryer can have a rotisserie assembly for mounting and rotating the whole turkey such that only a lower half of the whole turkey is submerged within the cooking oil at any one time. The deep fryer can include a kick-stand feature that allows a user to lower and raise the rotisserie assembly including the whole turkey using only one hand such that a user need not lean over or otherwise put their hands or body above the frying basin.

9 Claims, 14 Drawing Sheets

(56) References Cited

U.S. PATENT DOCUMENTS

| | | |
|---|---|---|
| D711,183 S | 8/2014 | Bernheim |
| 8,850,965 B2 | 10/2014 | Popiel et al. |
| 8,943,953 B2 | 2/2015 | Rutigliano et al. |
| 9,003,960 B2 | 4/2015 | Rutigliano et al. |
| D760,017 S | 6/2016 | Berge |
| 2007/0028780 A1 | 2/2007 | Popiel et al. |
| 2008/0110350 A1* | 5/2008 | Wang ................ A47J 37/1295 99/409 |
| 2009/0044706 A1* | 2/2009 | Foster ................ A47J 36/00 99/336 |
| 2009/0205511 A1 | 8/2009 | Tienor |

\* cited by examiner

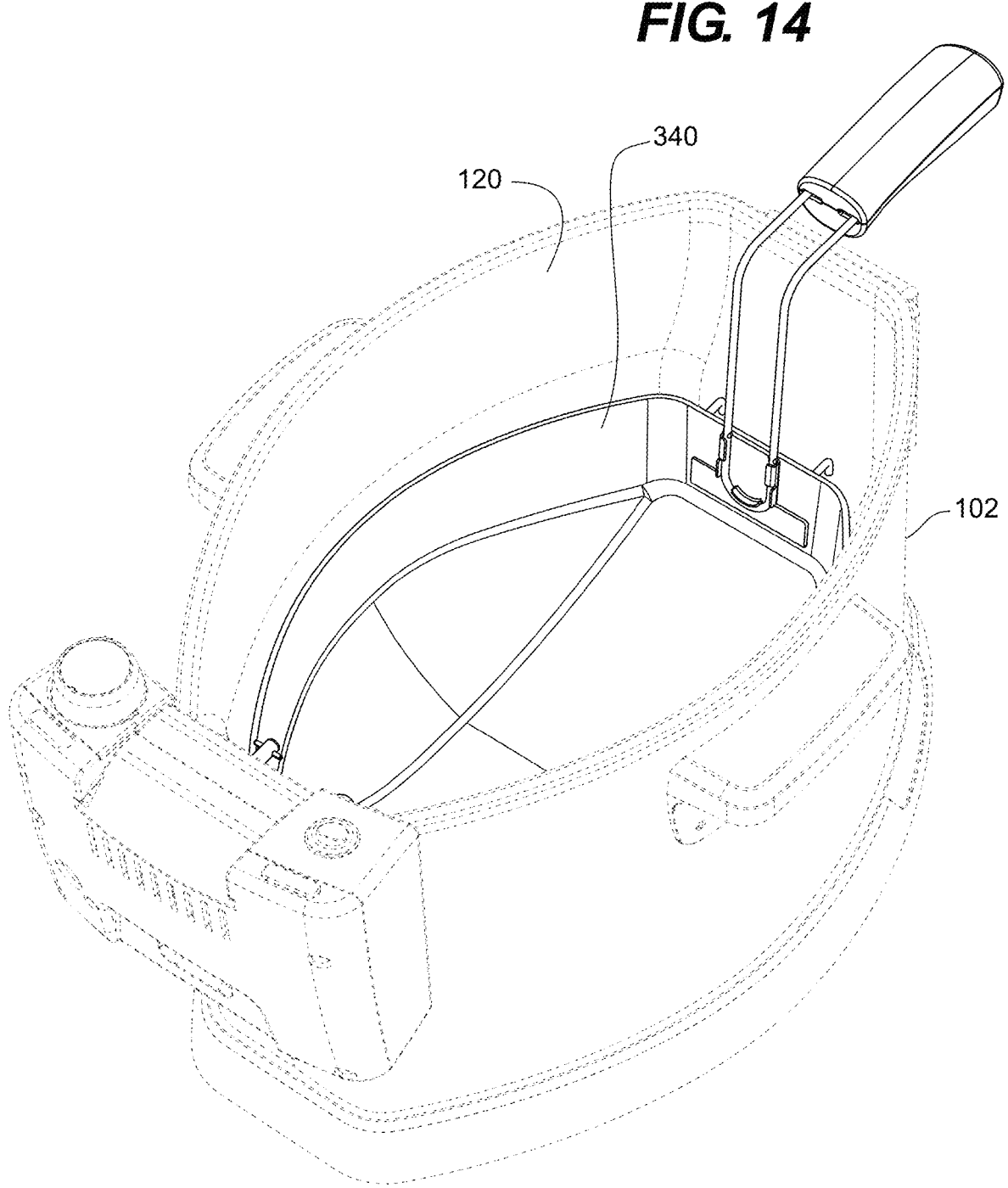

ROTISSERIE TURKEY DEEP FRYER

CROSS-REFERENCE TO RELATED APPLICATIONS

The present application claims the benefit of U.S. Provisional Application No. 62/473,001, filed Mar. 17, 2017, which is hereby incorporated herein in its entirety by reference.

TECHNICAL FIELD

The present invention is directed to countertop deep fryer appliances. More specifically, the present invention is directed to a rotisserie deep fryer that uses a reduced volume of cooking oil.

BACKGROUND

Residential deep fryer appliances are well known and are frequently used to prepare a variety of deep fried food. In addition to their frequent use in preparing side items such as french fries and onion rings, deep fryers are often used in preparing food such as fish and even turkeys. While a number of prior art devices are capable of deep frying whole turkeys, registration guidelines put forward by Underwriters Laboratories that limit the amount of cooking oil that can be used in a countertop deep fryer have made it more difficult to accommodate whole turkeys. As such, it would be advantageous to have a deep fryer that meets the cooking oil volume limitations for UL registration while still providing for effective and safe cooking of whole turkeys.

SUMMARY

The deep fryer of the present invention accomplishes these objectives by redesigning a frying basin so as to successfully deep fry a whole turkey while meeting UL® guidelines for maximum cooking oil volume. The frying basin can comprise a rounded profile so as to avoid dead spaces within the frying. The frying basin can further include an element channel at a bottommost portion of the frying basin to accommodate an immersion heating element. The deep fryer can further comprise a rotisserie assembly for mounting and rotating a whole turkey such that only a lower half of the whole turkey is submerged within the cooking oil at any one time. The rotisserie assembly can comprise a kick-stand feature that allows a user to lower and raise the whole turkey using only one hand such that a user need not lean over or otherwise put their hands or body above the frying basin when lowering or raising the whole turkey from the frying basin. In some embodiments, the rotisserie assembly can be removed from the frying basin such that the frying basin can be utilized as a conventional deep fryer using a basket for holding food items to be cooked.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which:

FIG. 14 is a rear perspective view of the deep fryer of FIG. 13.

Figure 1:
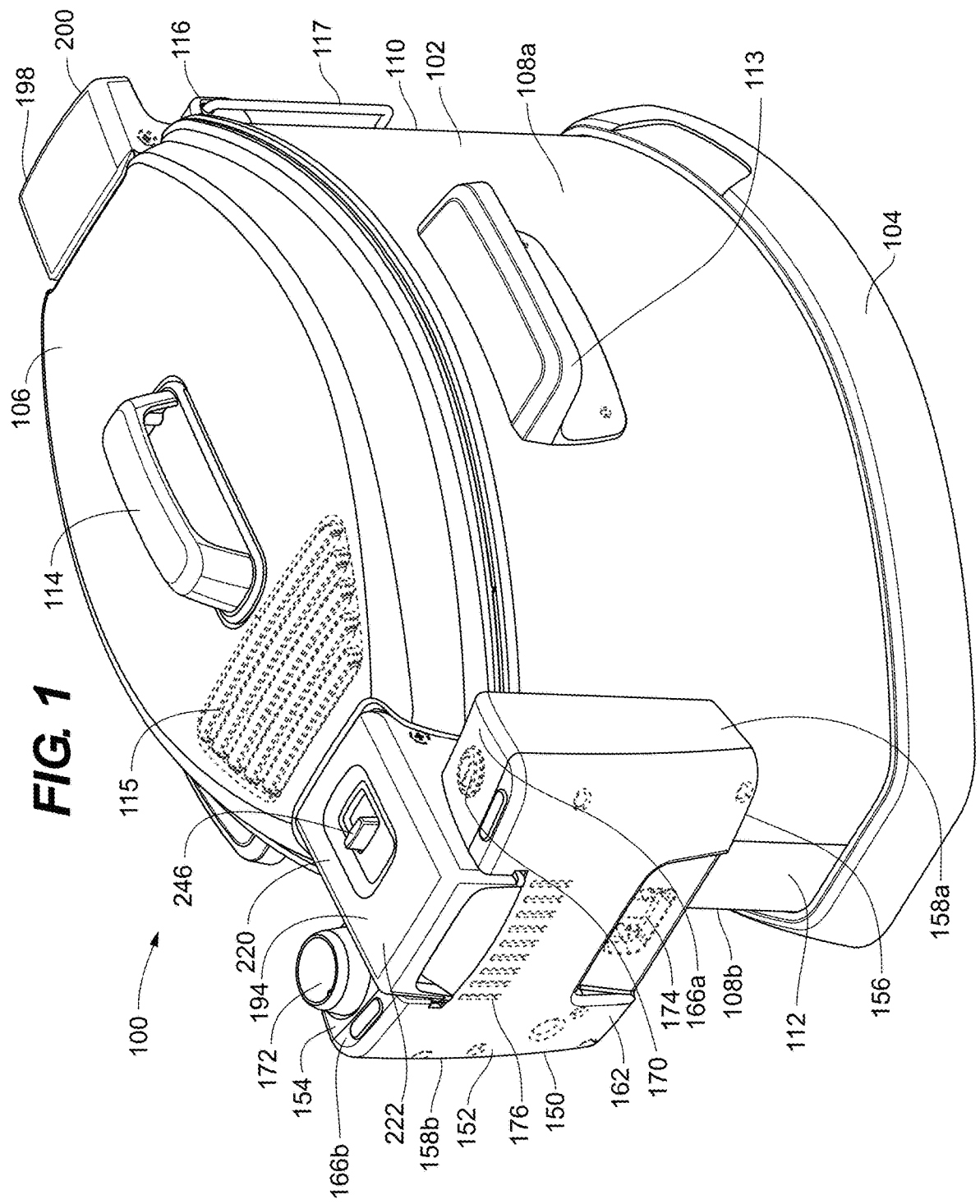
FIG. 1 is rear, perspective view of a deep fryer according to an embodiment of the present invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring generally to FIGS. 1-5, a deep fryer 100 of the present invention can comprise an outer body 102, a base assembly 104 and a lid 106. Outer body 102 generally comprises a pair of side walls 108a, 108b, a front wall 110 and a rear wall 112. Each of the side walls 108a, 108b include a lifting handle 113. Lid 106 can comprise a lid handle 114 and one or more vent apertures 115. Front wall 110 can include a stand handle 116 include a rotatable support member 117. Rotatable support member 117 includes a pair of side arms 118a, 118b and a support arm 119 defining a pair of support notches 119a, 119b. Outer body 102 and lid 106 can be formed of conventional appliance materials including, for example, aluminum, stainless steel and/or painted mild steel.

Figure 6:
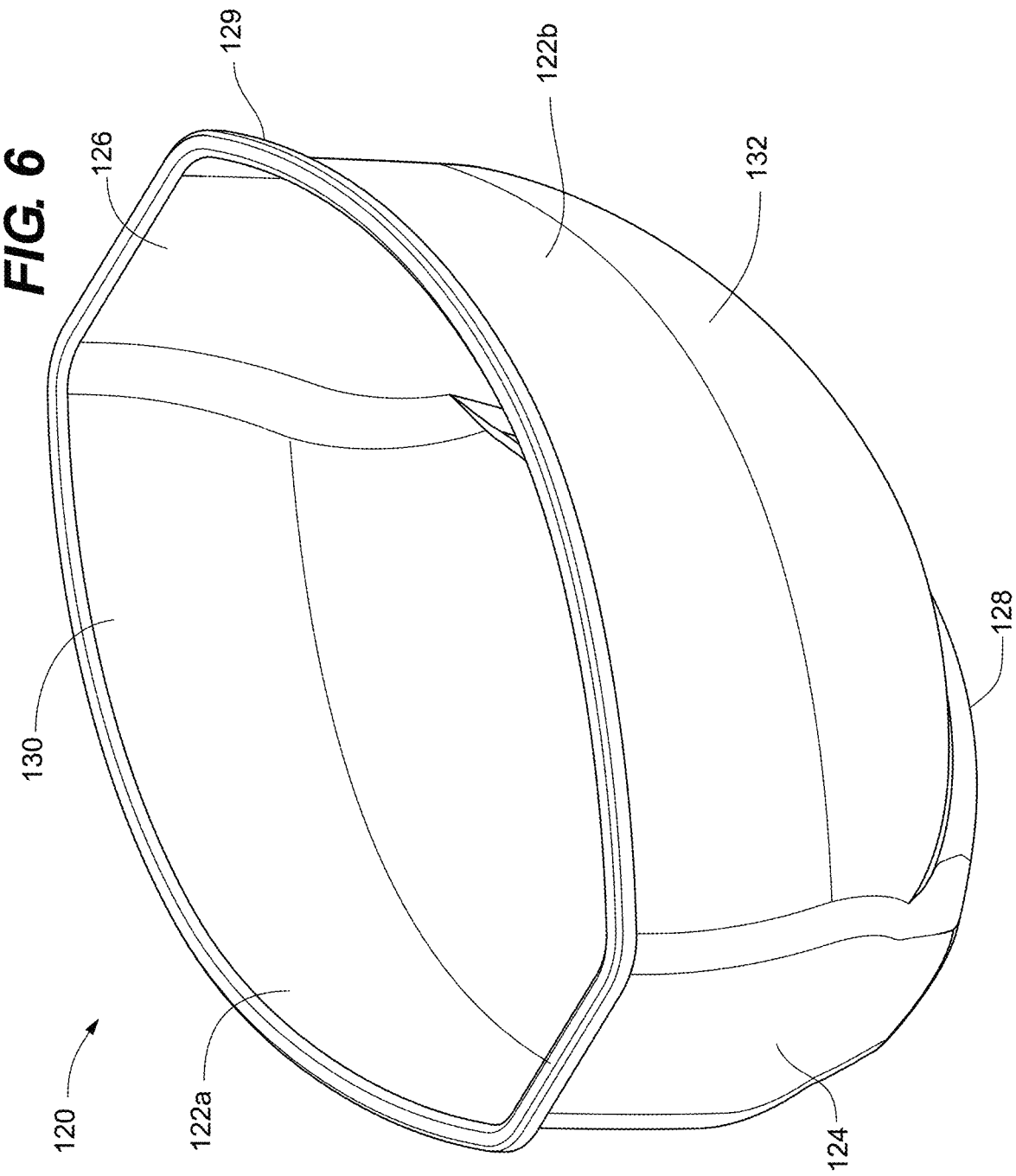
FIG. 6 is a front, perspective view of a frying basin according to an embodiment of the present invention.
Figure 7:
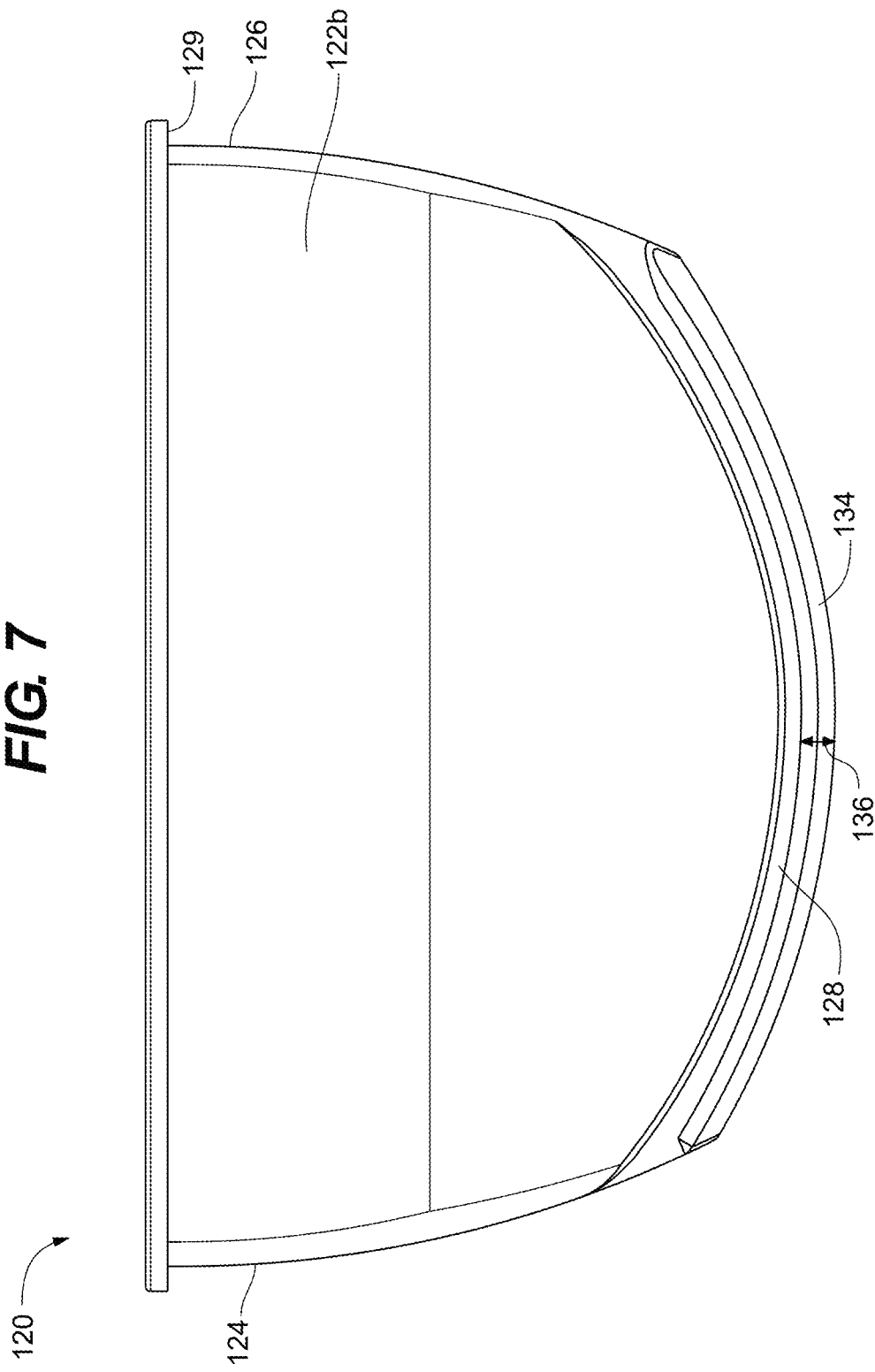
FIG. 7 is a side view of the frying basin of FIG. 6.
Figure 8:
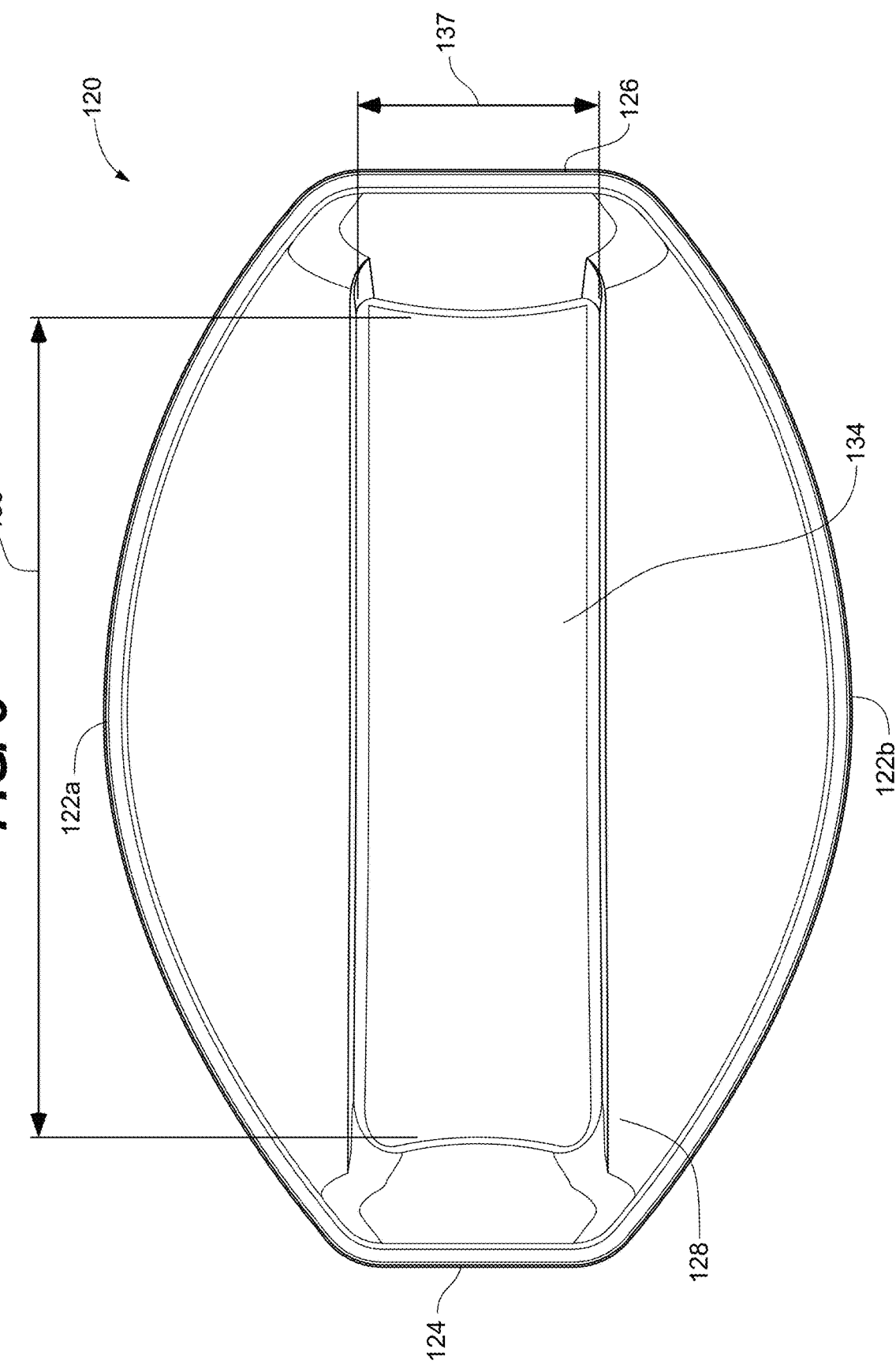
FIG. 8 is a top view of the frying basin of FIG. 6.

With reference to FIGS. 5-8, deep fryer 100 further comprises a frying basin 120 that resides within the outer body 102. Frying basin 120 generally comprises a pair of basin side walls 122a, 122b, a basin front wall 124, a basin rear wall 126 and a basin floor 128. The basin side walls 122a, 122b, basin front wall 124 and basin rear wall 126 cooperatively define an upper basin lip 129 that surrounds a basin opening 130. As seen in FIGS. 6-8, each of the basin side walls 122a, 122b, basin front wall 124, basin rear wall 126 and basin floor 128 define an arcuate profile 132 that is intended to correlate to a whole turkey perimeter when viewed from an end of the whole turkey. Basin floor 128 further defines a recessed channel 134 having a channel depth 136, a channel width 137 and a channel length 138. In some representative embodiments, the basin floor 128 can be modified such that frying basin 120 can be placed onto a flat surface such as, for example, a counter so as to avoid tipping or rocking. For example, basin floor 128 can comprise feet, either formed directly into the basin floor 128 or by adding polymeric feet, for example, rubber or silicon feet. Alternatively, basin floor 128 may include one or more flat surfaces formed directly with the basin floor 128 or otherwise coupled to the basin floor 128, wherein the frying basin 120 could reside on the one or more flat surfaces.

As shown in FIGS. 1-3, 5, 9a, 9b and 10, deep fryer 100 further comprises a control assembly 150 that is fixedly mounted to the rear wall 112. Control assembly 150 generally comprises a drip proof housing 152 for enclosing the various electrical and control elements while also providing a mounting location for operator interface components and rotisserie elements as will be discussed below. Drip proof housing 152 generally comprises an upper housing surface 154, a lower housing surface 156, a pair of side housing surfaces 158a, 158b, a front housing surface 160 and a rear housing surface 162. Front housing surface 160 attaches to a spacer member 164 to couple the drip proof housing 152 to the outer body 102, thus providing a thermal break between the drip proof housing 152 and the outer body 102 to limit heat conduction form the outer body 102 to the drip proof housing 152. Upper housing surface 154 is generally defined by a pair of control surface 166a, 166b and a recessed central portion 166c. Recessed central portion 166c has a rounded upper profile 168 from the front housing surface 160 to the rear housing surface 162. Control surfaces 166a, 166b include control interfaces such as, for example, a power button 170 a heat control knob 172. Rear housing surface 162 can include a power receptacle 174 and one or more housing vents 176. Drip proof housing 152 encloses various electrical components including a motor 178, for example a bidirectional synchronous motor. Motor 178 includes a motor shaft 179 that extends out of the front housing surface 160 at a position just above the rear wall 112 Drip proof housing 152 further encloses the connection ends of a heating element 180, for example, a resistive heat element. Heating element 180 also extends out of the rear wall 112 above the rear wall 112. Heating element 180 has a shape selected to substantially resemble the arcuate profile 132 of the basin rear wall 126 and having an element end portion 182 that resides fully within the recessed channel 134. Heating element 180 has a diameter less than the channel depth 136 such that the heating element 180 does not extend above the level of the basin floor 128.

Deep fryer 100 can further comprise a rotisserie assembly 190 as shown in FIGS. 5, 9a, 9b and 10. Generally the rotisserie assembly 190 includes a front mounting assembly 192, a rear mounting assembly 194 and a spit assembly 196. Front mount assembly 192 includes a mount handle 198 having a handle body 200. Handle body 200 defines and upper ledge 202, a lower notch 204 and a manipulation portion 206. Extending from underneath the handle body 200 are a pair of mounting arms 208a, 208b. Each mounting arm 208a, 208b defines a leading edge 210 and a trailing edge 212. Leading edge 210 can include a tapered portion 214. A front mounting plate 215 can be mounted across the trailing edge 212 of the mounting arms 208a, 208b. At a bottom most point of the mounting arms 208a, 208b, a mounting notch 216 can defined between the leading edge 210, the trailing edge 212 and the front mounting plate 215.

Referring again to FIGS. 5, 9a, 9b and 10, rear mounting assembly 194 generally comprises a mount body 220 including an upper mount surface 222 and a lower mount surface 224. Lower mount surface 224 is partially defined by an arcuate mount portion 226. Arcuate mount portion 226 is formed so as to correspond to the rounded upper profile of the recessed central portion 166c. Extending from the lower mount surface 224 is a drive guard 228 that partially encloses a drive assembly 230. Drive assembly 230 generally comprises a slidable drive shaft 232, a shaft sprocket 234, a drive chain 236, a spit sprocket 238 and a spit drive shaft 240. Slidable drive shaft 232 includes a shaft body 242 and a shaft coupler 244. Drive assembly 230 further comprises an engagement switch 246 that engages the shaft coupler 244 so as to slidably engage and disengage the shaft coupler 244 to/from the motor shaft 179.

Spit assembly 196 generally comprises a front spit plate 250, a rear spit plate 252 and a pair of spit arms 254a, 254b as shown in FIGS. 5, 9a, 9b and 10. Front spit plate 250 can include a pair of spit receiving cavities 251a, 251b. Spit arms 254a, 254b are preferably fabricated from a single piece of material, for example stainless or aluminum rod, and are removably coupled to front spit plate 250 such that a whole turkey can be slidably retained on the spit arms 254a, 254b before attaching the spit arms 254a, 254b to the front spit plate 250. Spit arms 254a, 254b can each include a spit tip 255 that can include a point to ease insertion of the spit arms 254a, 254b through the whole turkey. Rear spit plate 252 includes a pair of retention tabs 256a, 256b and a pair of mounting clips 258a, 258b. A retention clip 260 locks the spit arms 254a, 254b to the rear spit plate 252. Front spit plate 250 is rotatably coupled to the front mounting plate 215 with a fastener 262 while the rear spit plate 252 is rotatably coupled to the spit drive shaft 240. As such, the spit assembly 192 is able to rotate along an axis defined between the fastener 262 and the spit drive shaft 240.

In using the deep fryer 100 of the present invention, a user first assembles the deep fryer 100 by positioning the base assembly 104 on a flat surface such as, for example, a table or countertop. If the frying basin 120 has previously been removed from the outer body 102, the user then orients the frying basin 120 such that the basin front wall 124 is proximate the front wall 1120 and the basin rear wall 126 is proximate the rear wall 122 and then sets the frying basin 120 into the body opening 110 until the upper basin lip 124 resides on the upper body surface 109. Next, a user positions the control assembly 150 above the outer body 102 such that the drip proof housing is above the rear wall 112 and the heating element is positioned above the basin opening 130. The user lowers the control assembly 150 such that the drip proof housing engages the exterior of the rear wall 112 while the element end portion 182 sets into the recessed channel 134. When properly positioned, the element end portion 182 will not extend or otherwise project above the basin floor 128 while a vertical portion of the heating element 180 resides along the basin rear wall 126 and is arranged to substantially match the arcuate profile 132 of the basin rear wall 126.

With the control assembly 150 attached to the outer body 102, the user can then add the cooking oil, for example, peanut oil into the frying basin 120 by pouring it into the basin opening 130. Due to the design of the frying basin 120, and more specifically due to the arcuate profile 132 of the basin side walls 122a, 122b, basin front wall 124, basin rear wall 126 and basin floor 128 as well as the positioning of the heating element 180 within the recessed channel 134, a reduced amount of cooking oil not exceeding five liters of cooking oil is all that is required to properly cook a whole turkey. With the cooking oil within the frying basin 120, the user plugs in the control assembly 150 to an electrical receptacle using a suitable cord and the power receptacle 174. With the control assembly 150 connected to power, the user can turn on the power button 170 and adjust the heat control knob 172 to begin heating the cooking oil with the heating element 180 to the desired frying temperature, for example, 375° F.

As the cooking oil is heating with the frying basin 120, the user can mount the whole turkey to the spit assembly 192. Generally, the user detaches the spit arms 254a, 254b from the front spit plate 250 and then directs the spit tip 255 of each of the spit arms 254a, 254b through the whole turkey from the front to the rear of the whole turkey. The user then reattaches the spit arms 254a, 254b to the front spit plate 250 by directing the spit tips 255 of each spin arm 254a, 254b into the corresponding spit receiving cavity 251a, 251b such that the whole turkey resides on the spit arms 254a, 254b with the rear spit plate 252 and the front spit plate 250 located proximate the rear and front ends of the whole turkey.

Figure 9A:
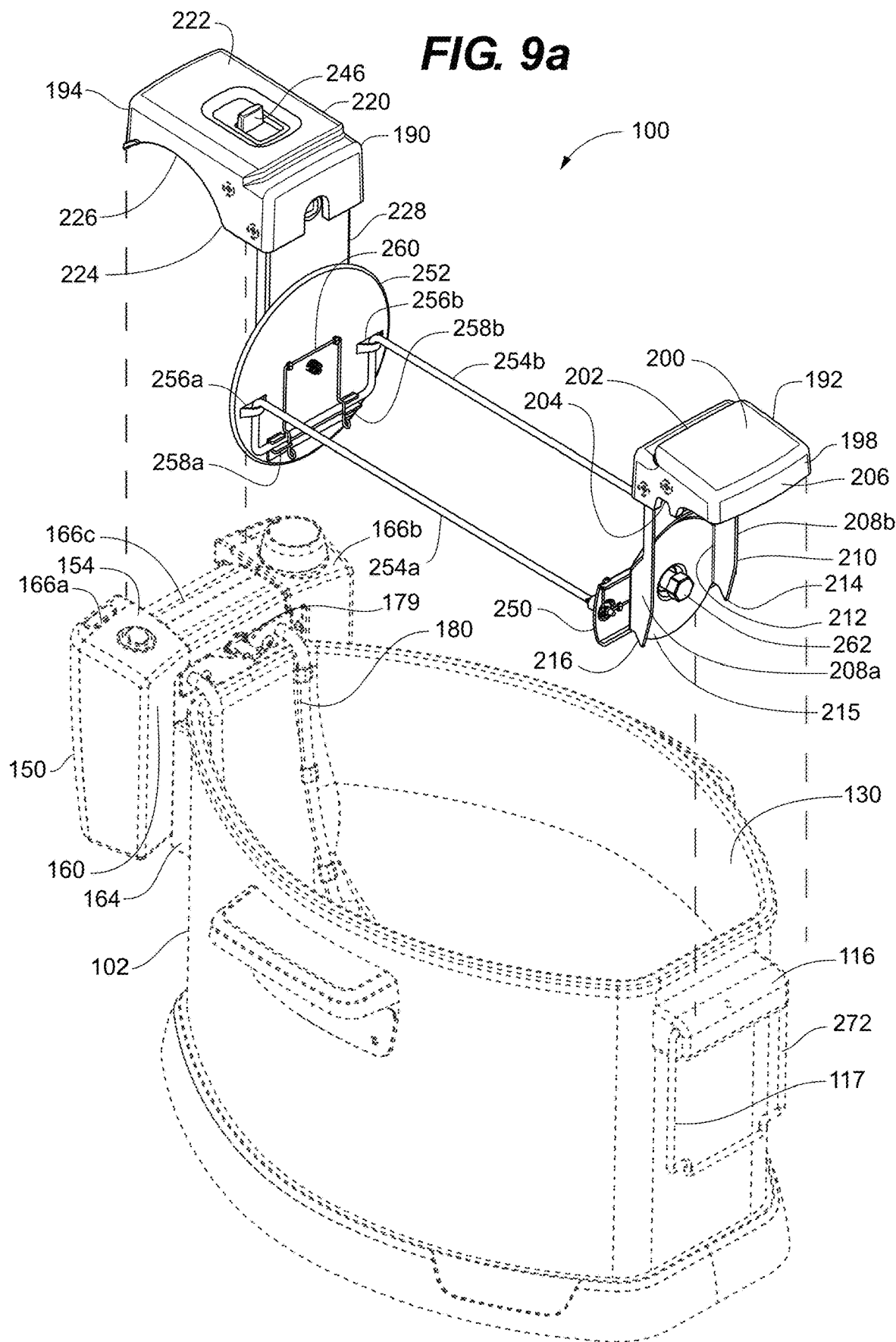
FIG. 9a is a front, exploded, perspective view of the deep fryer of FIG. 1.
Figure 9B:
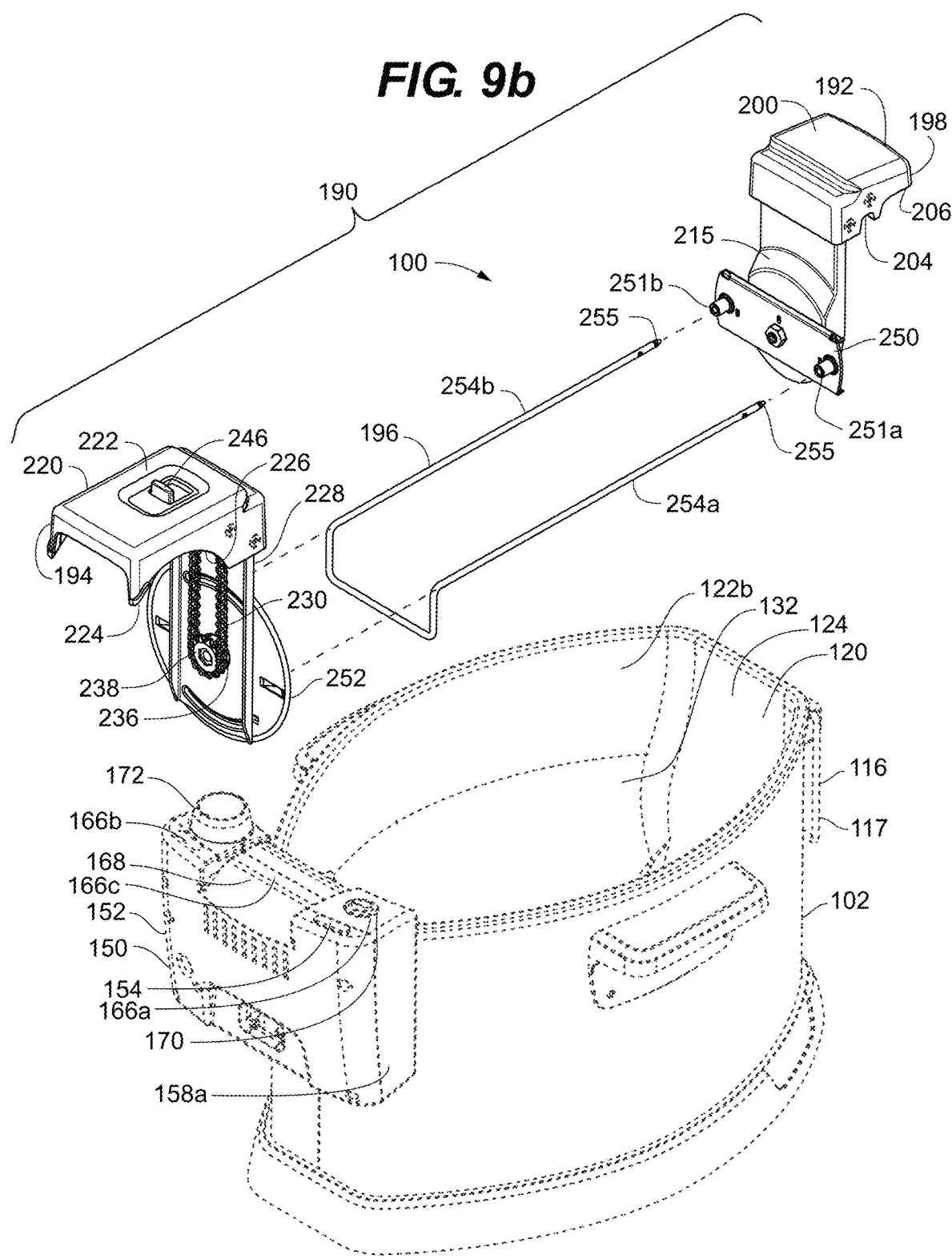
FIG. 9b is a rear, exploded, perspective view of the deep fryer of FIG. 1.
Figure 10:
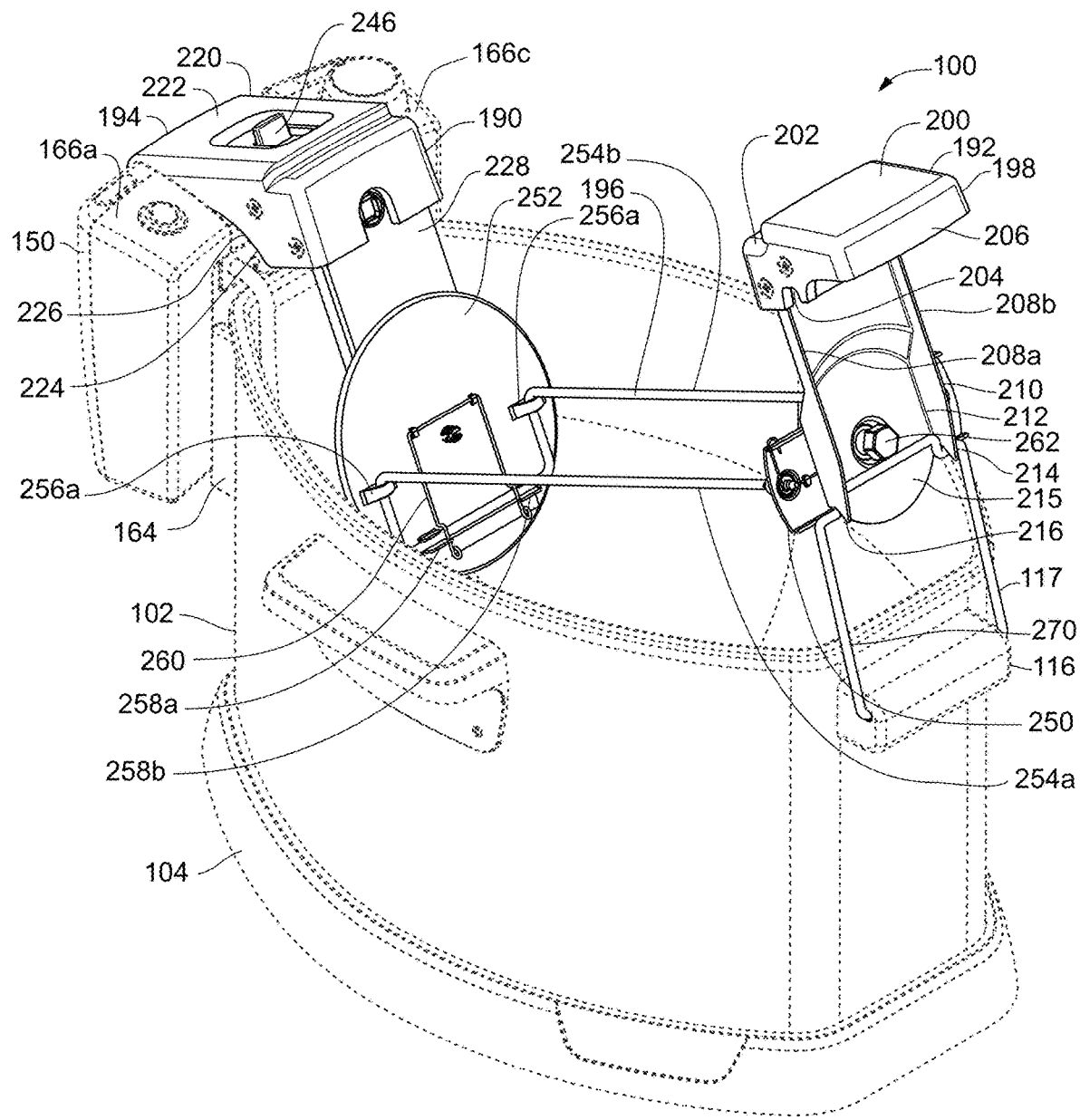
FIG. 10 is a front, perspective view of the deep fryer of FIG. 1.

With the whole turkey mounted to the spit assembly 192, the user positions the spit assembly 192 such that the rear mounting assembly, and more specifically, the mount body 220 is positioned above the drip proof housing 152 with the whole turkey over the basin opening 130 as is shown generally in FIGS. 9a and 9b. The user lowers the mount body 220 such that the arcuate mount portion 226 of the lower mount surface 224 engages the recessed central portion 166c of the upper housing surface 154 with the whole turkey still positioned above the basin opening 130 as shown in FIG. 10. Next the user rotates the rotatable support member 117 to a supporting orientation 270 as shown in FIG. 10. With the arcuate mount portion 226 supported by and rotating on the recessed central portion 166c, the user lowers the front mounting assembly 192 such that the mounting notches 216 engage the support notches 119a, 119b of the rotatable support member and the front mounting assembly 192, including the whole turkey is supported above the basin opening 130 and out of the cooking oil. At this point, no user input is needed to continue maintaining the whole turkey directly above the cooking oil.

Figure 2:
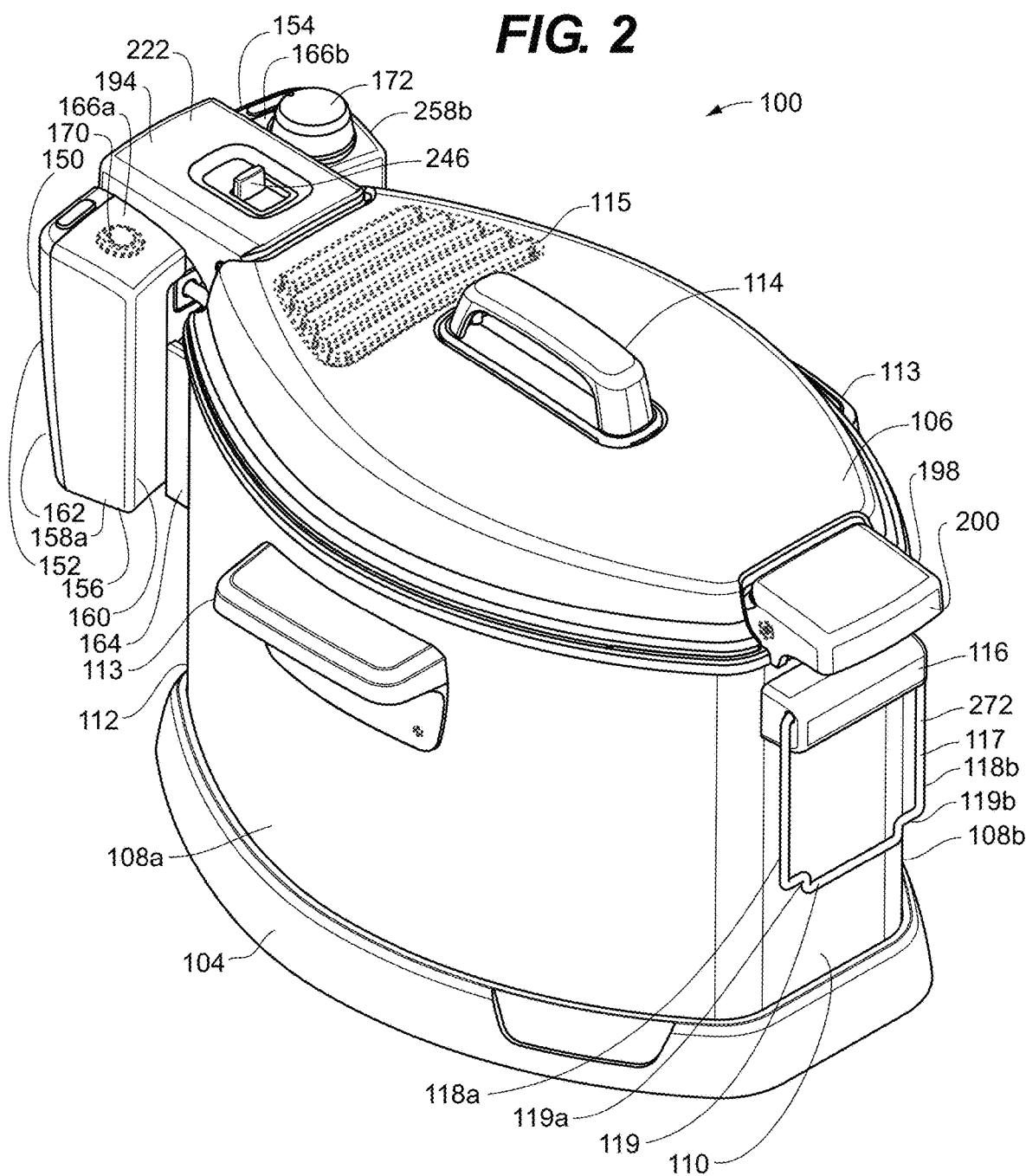
FIG. 2 is a front, perspective view of the deep fryer of FIG. 1.
Figure 3:
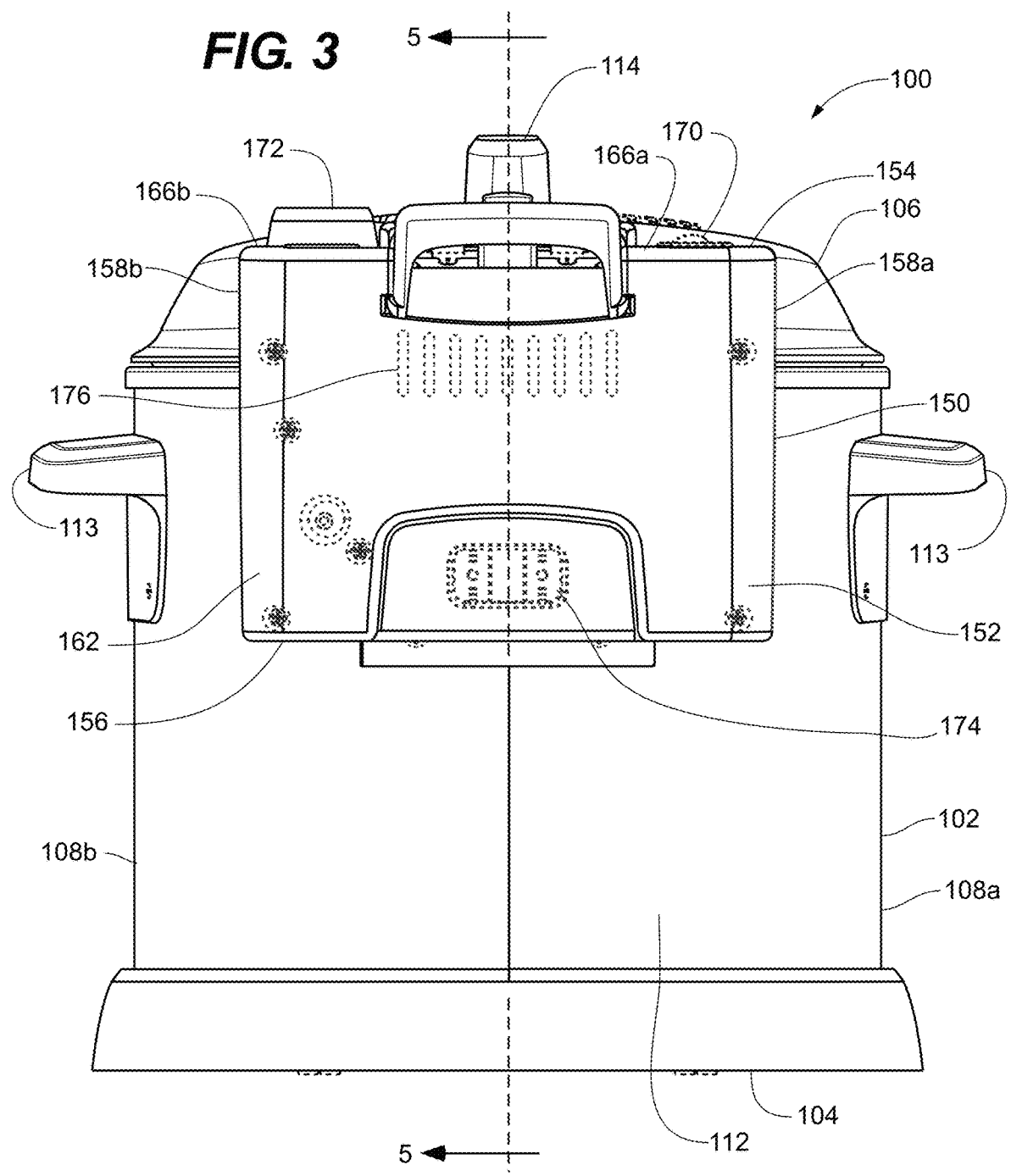
FIG. 3 is a rear view of the deep fryer of FIG. 1
Figure 4:
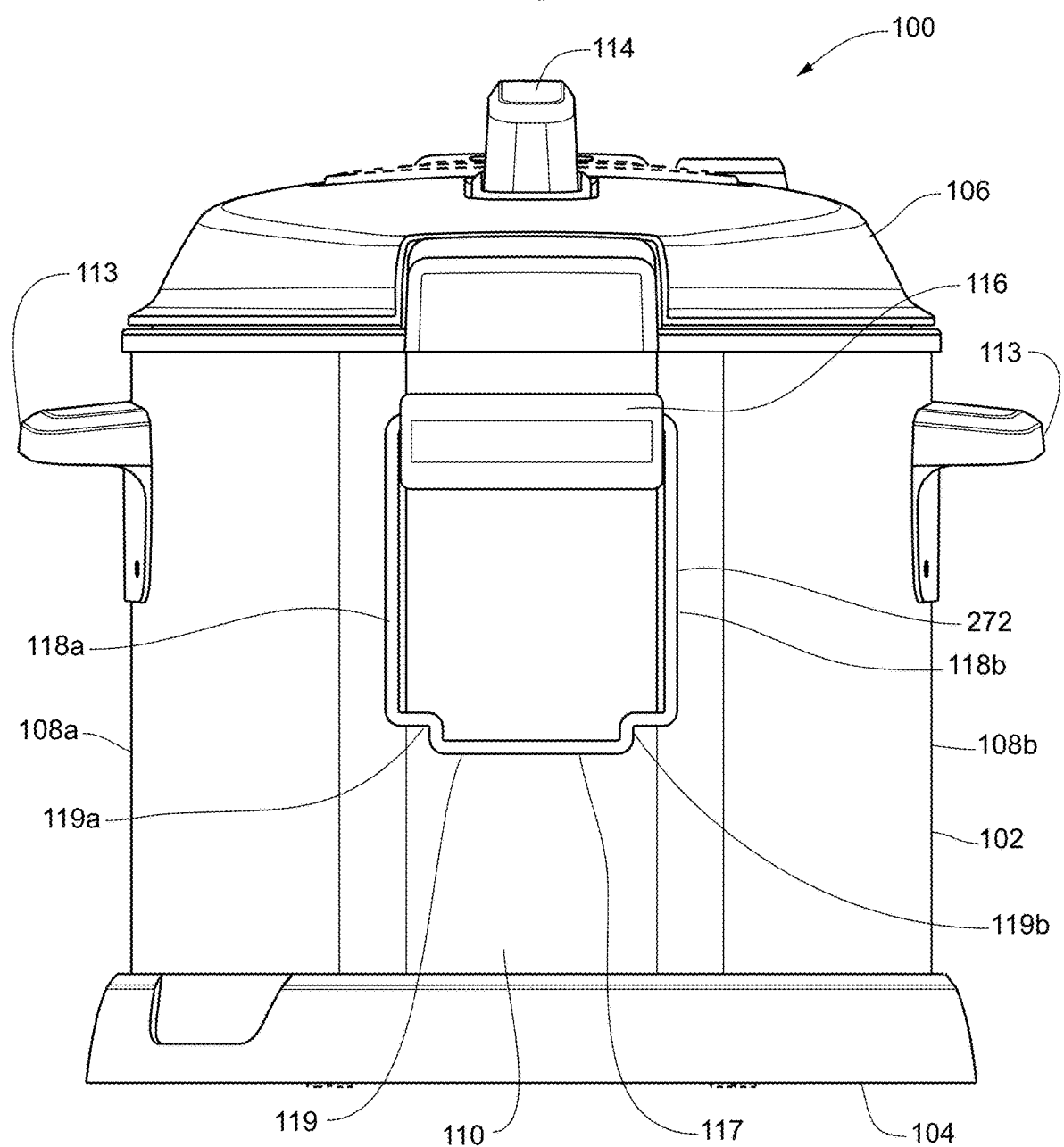
FIG. 4 is a front, view of the deep fryer of FIG. 1.
Figure 5:
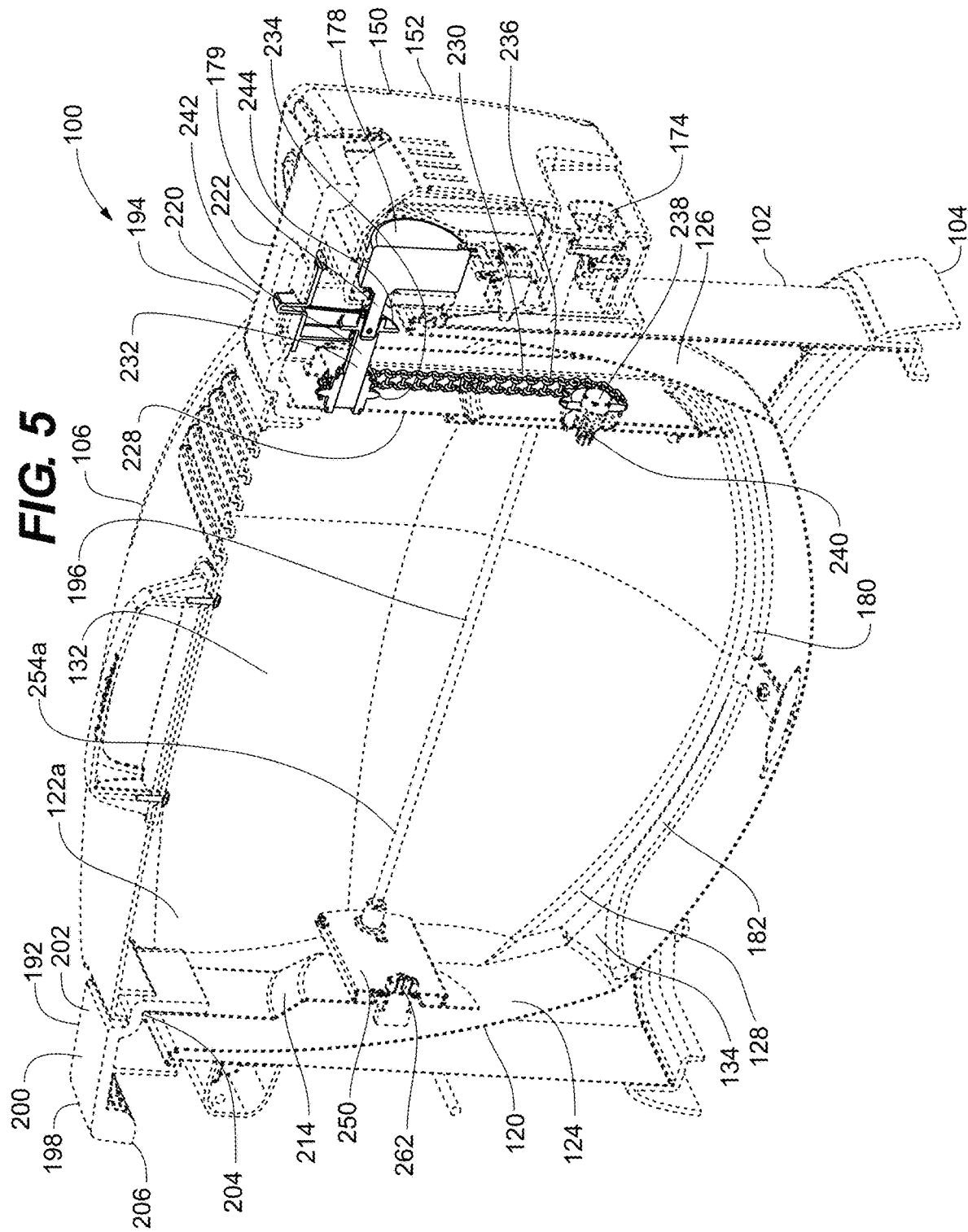
FIG. 5 is rear, perspective, section view of the deep fryer of FIG. 1 taken at line 5-5 of FIG. 3.

When the cooking oil reaches the desired cooking temperature, the user using only a single hand can lift on the mount handle 198 to disengage the mounting arms 208a, 208b from the rotatable support member 117, which can then be rotated to a lowered orientation 272 as seen in FIGS. 2, 6 and 9. As the user can now manipulate the rotisserie assembly 190 using only a single hand, the user is not required to stand over or reach over the basin opening 130. The user can then begin lowering the front mounting assembly 192 into the basin opening 130 such that the tapered portion 214 of the mounting arms 208a, 208b begin guiding the front mounting assembly 192 into the basin opening 130. As the user lowers the front mounting assembly 192, the lower notch 204 eventually comes into contact with the upper basin lip 129 along the front wall 124. At this point, the whole turkey will be positioned such that approximately half of the whole turkey resides within the heated cooking oil and approximately half of the whole turkey resides above the heated cooking oil. The portion of the whole turkey within the heated cooking oil will be experiencing vigorous frying. As the lowering of the whole turkey is accomplished with only a single hand and the user is never exposed to or positioned above the basin opening 130, the user will not be exposed to any oil spatter or foaming that may be occur due to moisture on the whole turkey or due to the addition of too much cooking oil or too large a whole turkey so as to provide a safer and less intimidating frying experience for the user.

With the whole turkey partially submerged in the heated cooking oil, the user next engages the rotisserie feature of the deep fryer 100. The user slidably advances the engagement switch 246 toward the rear wall 112 such that the shaft coupler 244 slidably engages the motor shaft 179. The user then turns on the motor 178 with the motor button 177 whereby rotation of the motor shaft 179 is translated to the slidable drive shaft 232. The slidable drive shaft 232 turns the shaft sprocket 234, which results in the drive chain 236 turning the spit sprocket 238, whereby the spit assembly 192 including the whole turkey is caused to rotate around the axis defined by the spit drive shaft 240 and the fastener 262. In this way, essentially every part of the whole turkey is submerged within the heated cooking oil during one half of a rotation of the spit drive shaft 240. When motor 178 comprises a bidirectional synchronous motor, any obstruction or interference that would stop the rotation of the whole turkey, merely result in the motor 178 beginning to rotate in an opposite direction in an attempt to overcome and eliminate the issue.

During cooking, the whole turkey is preferably rotated through the heated cooking oil at a rate of 1-2 rpm. In the case of a 15 pound turkey with the cooking oil at 375° F., the whole turkey can be completely cooking in approximately 60 minutes. Following cooking, the user turns off the motor button 177 and power button 170 to stop the rotisserie action. Next, the user slidably retracts the engagement switch 246 to disengage the shaft coupler 244 and the motor shaft 179. Using the mount handle 198, the user then begins lifting the front mounting assembly 192 out of the basin opening 130. The user then rotates the rotatable support member 117 to the supporting orientation 270 and lowers the mount handle 198 such that the mounting notches 216 engage the support notches 119a, 119b and the whole turkey is supported above the basin opening 130 and any cooking oil on the whole turkey is allowed to drip back into the frying basin 120. Once the whole turkey has rested and the cooking oil has dripped back into the frying basin 120, the user can lift the rotisserie assembly 190 off of the drip proof housing 152 and the upper basin lip 129, whereby the whole turkey can be carried to a cutting location. The user then detaches the spit arms 254a, 254b from the front spit plate 250 and the spit arms 254a, 254b can be withdrawn from the whole turkey.

Figure 11:
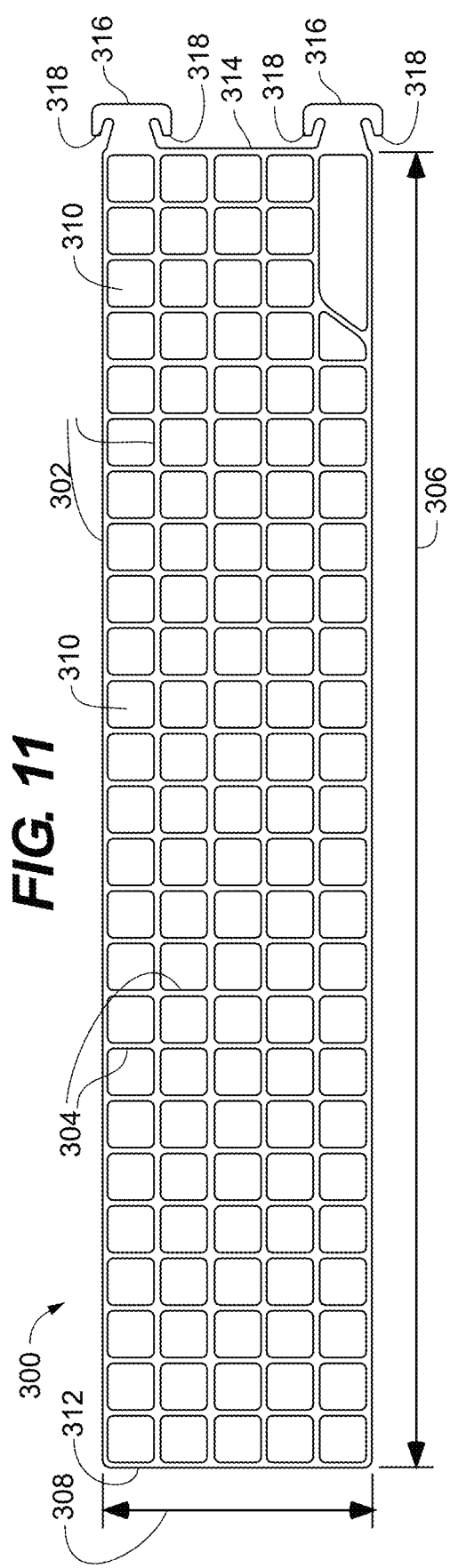
FIG. 11 is a top view of a retention net according to an embodiment of the present invention.
Figure 12:
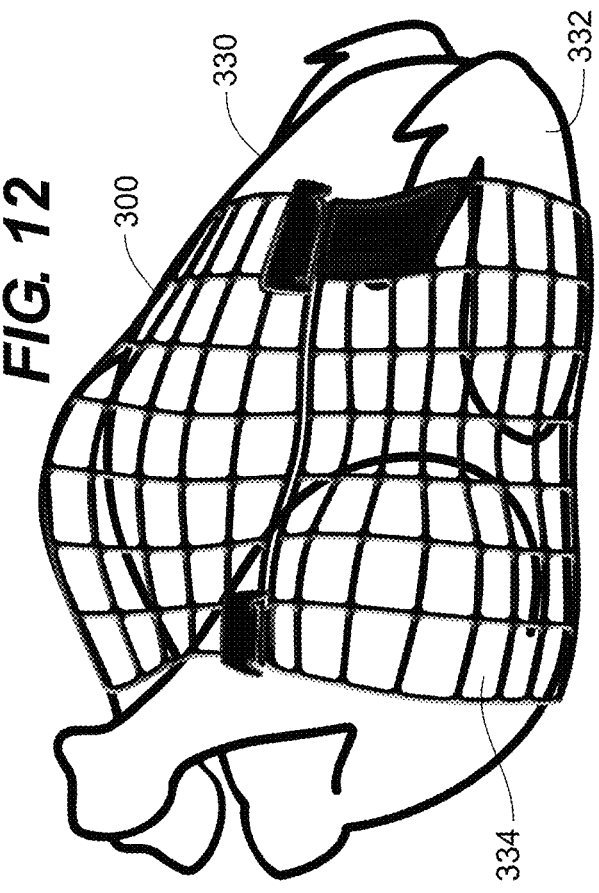
FIG. 12 is a side view of the retention net of FIG. 11 retaining a whole turkey according to an embodiment of the present invention.
Figure 13:
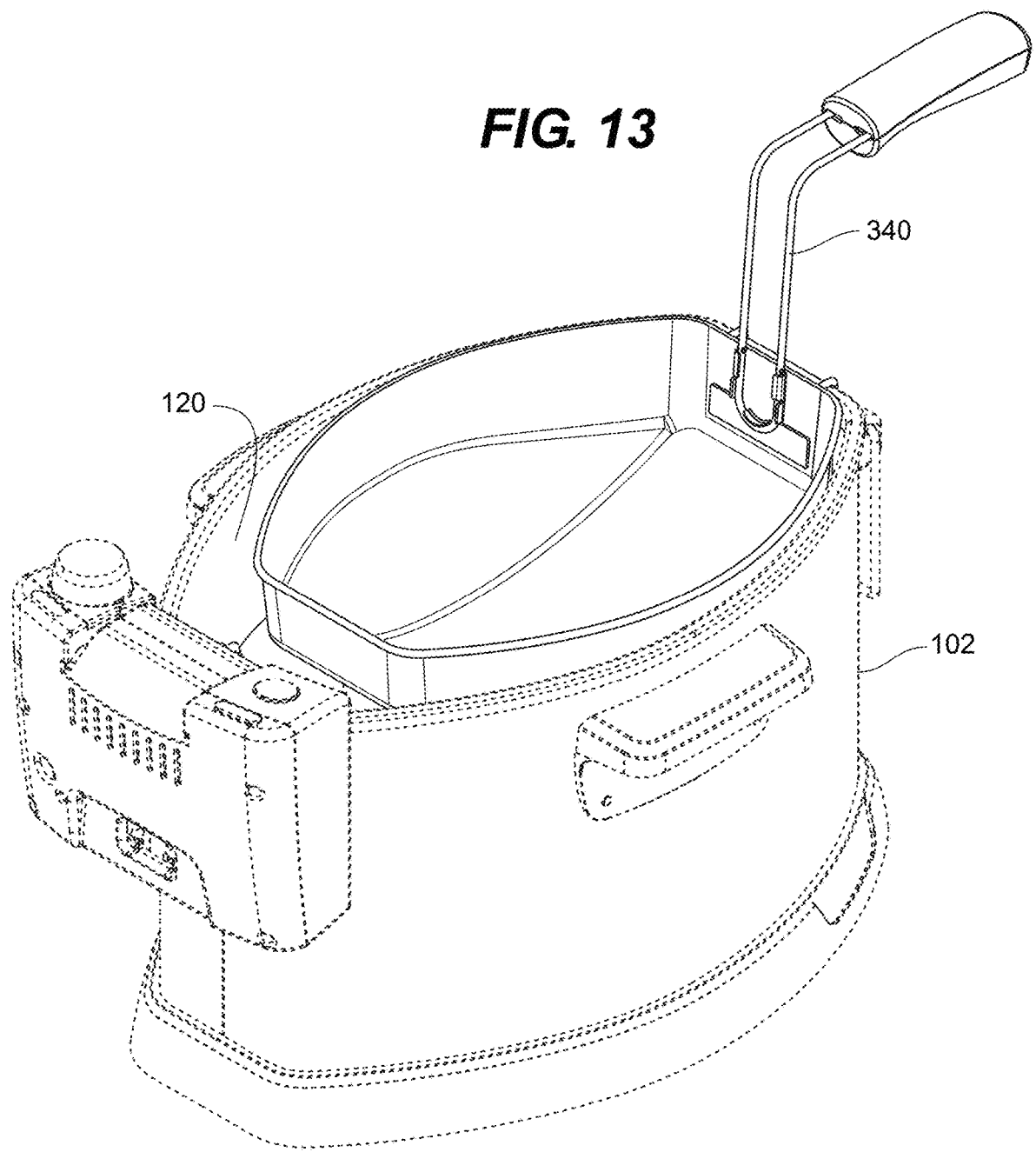
FIG. 13 is a rear, perspective view of the deep fryer of FIG. 1 with a frying basket according to an embodiment of the present invention.

As discussed previously, motor 178 can comprise a bidirectional synchronous motor that will stop and rotate in an opposite direction in the event of the whole turkey encountering an obstruction or interference that would impact the rotation of the whole turkey. The positioning of the heating element 180 such that the element end portion 182 resides fully within the recessed channel 134 in one way to prevent such an obstruction. As the element end portion 182 has no portion above the basin floor 128, the potential for any part of the whole turkey contacting and being obstructed by the element end portion 182 is substantially reduced. In some embodiments, a retention net 300 as shown in FIG. 11 can be utilized to constrain the whole turkey, for example the wings or drumsticks, to prevent the whole turkey from spreading and coming into contact with the frying basin 120. As illustrated, retention net 300 can be formed of polymers that can tolerate high frying temperatures and are suitable for food contact such as, for example, silicone. Retention net 300 generally comprises a plurality of horizontal elements 302 and vertical elements 304 that cooperatively define a net length 306 and a net width 308. The horizontal elements 302 and vertical elements 304 define a plurality of openings 310. The net length 308 is defined between a first end 312 and a second end 314, wherein the second end 314 includes a plurality of retention elements 316. Each retention elements 316 generally includes one or more hook portions 318. As seen in FIG. 12, the retention net 300 can be wrapped about a whole turkey 330 to retain wings 332 and drumsticks 334 in close proximity to a turkey body 336. Either prior to or after mounting the whole turkey 330 on the spit arms 254a, 254b, first end 312 can be wrapped about the whole turkey and brought into proximity with the second end 314 such that the hook portions can be positioned within and capture suitable openings 310 to tightly wrap the retention net around the whole turkey 330. The presence of openings 310 along the whole net length 306 allow the retention net 300 to be used with a variety of sizes of whole turkeys 330, or even smaller chickens.

As discussed previously, the arcuate profile 132 of the basin side walls 122a, 122b, basin front wall 124, basin rear wall 126 and basin floor 128 are intended to closely mimic the perimeter of a whole turkey. As such, the arcuate profile 132 of the frying basin 120 essentially eliminates corners and other dead spots that would otherwise be filled with cooking oil but not provide an area into which the whole turkey would be rotated. Similarly, the positioning of the element end portion 182 within the recessed channel 134 allows the whole turkey to rotate very closely to the arcuate profile 132 of the basin floor 128, which would not be possible if the element end portion 182 resided above the basin floor 128. By designing the frying basin 120 with the arcuate profile 132 so as to substantially reduce dead space, the amount of cooking oil required to cover approximately half of the whole turkey is substantially reduced and does not exceed 5 liters.

Finally, the removable nature of the rotisserie assembly 190 allows the deep fryer 100 to be used as a conventional non-rotisserie fryer as well. With the rotisserie assembly 190 removed, a conventional frying basket 340 can be set into the frying basin 120 for cooking items such as french fries, onion rings and the like. As such, the user need not have separate deep fryers and can use the cooking oil for both rotisserie and non-rotisserie frying. In addition, the removable nature of the major components of the deep fryer 100 include the outer body 102, base assembly 104, lid 106, frying basin 120, control assembly 150 and rotisserie assembly 190 provide for easier cleaning and disposal of used cooking oil following cooling of the cooking oil. In embodiments where the basin floor 128 includes feet and/or flat surfaces, the frying basin 120 can be removed from the outer body 102 and the frying basin 120 can placed on a counter or other flat surface to allow the cooking oil to cool, to assist in cleaning or to assist in cooking oil removal and disposal.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A rotisserie deep fryer, comprising:
    a body enclosing a frying basin;
    a control assembly including a motor and a heater, the control assembly mounted proximately to a first end of the body; and a removable spit assembly including a front mounting assembly, a rear mounting assembly mountable to the control assembly and at least one spit member, wherein the rear mounting assembly is radially rotatable relative to the control assembly such that the rear mounting assembly remains in contact with the control assembly as the front mounting assembly is lowered to a position supported by a second end of the body the second end being distally located relative to the first end,
    wherein the rear mounting assembly further comprises a rear spit plate operably coupled to a spit sprocket and wherein the motor is operably coupled to a shaft sprocket and wherein a drive chain operably couples the spit sprocket to the shaft sprocket.

2. The rotisserie deep fryer of claim 1, wherein the frying basin defines an arcuate profile.

3. The rotisserie deep fryer of claim 2, wherein the heater has a heater shaped selected to conform to the arcuate profile of the frying basin.

4. The rotisserie deep fryer of claim 1, wherein the frying basin includes a basin floor, said basin floor having a recessed channel defined therein and said heater being operably mounted within the recessed channel.

5. The rotisserie deep fryer of claim 4, wherein the recessed channel defines a channel depth such that the heater resides fully below the basin floor.

6. The rotisserie deep fryer of claim 1, wherein the front mounting assembly further includes a front handle and a pair of front mounting arms and the second end of the body further includes a front support member such that the pair of front mounting arm engage the front support member to support the front mounting assembly above the body.

7. The rotisserie deep fryer of claim 1, wherein the rear mounting assembly further includes a mount body having an arcuate lower surface, wherein the control assembly further defined a rounded upper profile surface and wherein the arcuate lower surface rotatably engages the rounded upper profile surface.

8. The rotisserie deep fryer of claim 1, wherein the rear mounting assembly further comprises a mount body having an engagement switch that is operably coupled to a shaft coupler, said shaft coupler being operably coupled to the shaft sprocket and wherein the engagement switch is configured to selectively slidingly engage the shaft coupler with a motor shaft of the motor.

9. The rotisserie deep fryer of claim 8, wherein the motor comprises a bidirectional synchronous motor.

* * * * *